June 7, 1932.   R. C. BENNER ET AL   1,861,467
STORAGE BATTERY
Filed Sept. 18, 1924
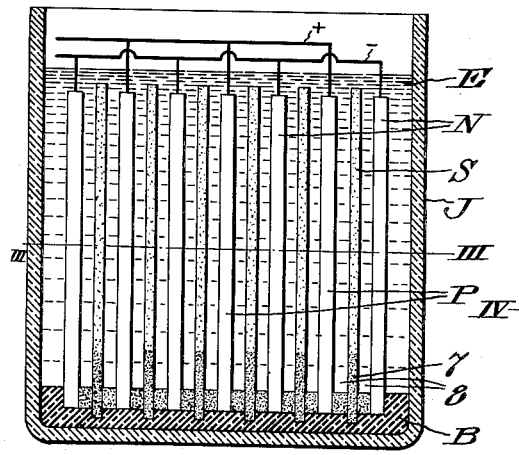
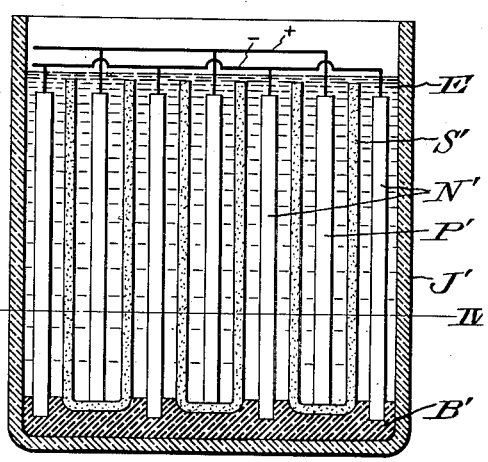
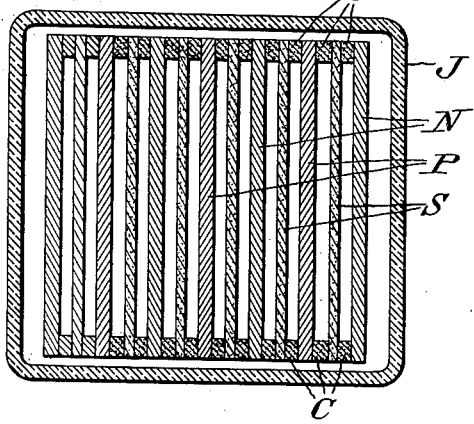
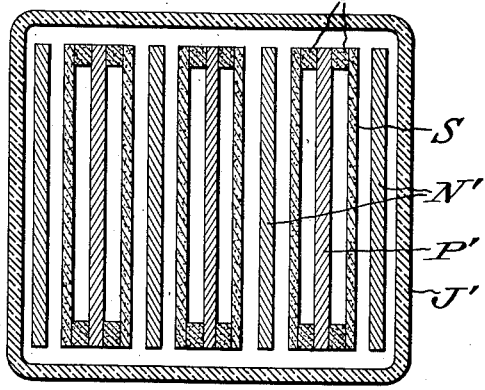
Inventors:
Raymond C. Benner,
Leroy C. Werking,
By Byrnes, Townsend & Brickenstein
Attorneys.

Patented June 7, 1932

1,861,467

UNITED STATES PATENT OFFICE

RAYMOND C. BENNER, OF BAYSIDE, AND LEROY C. WERKING, OF NEW YORK, N. Y., ASSIGNORS, BY MESNE ASSIGNMENTS, TO PREST-O-LITE STORAGE BATTERY CORPORATION, A CORPORATION OF INDIANA

STORAGE BATTERY

Application filed September 18, 1924. Serial No. 738,446.

This invention relates to improvements in storage cell or battery constructions. Particular objects of the invention are to provide an assembly in which circulation of electrolyte is facilitated and short-circuiting by deposits of dislodged active material is prevented under all ordinary conditions. In a preferred embodiment of the invention, these and other advantageous results are obtained by placing the electrode and separator assembly upon the bottom of the battery container, marginal portions of both electrodes and separators being embedded in an insulating, acid-resistant plastic, or equivalent means.

The construction referred to makes it possible to eliminate the supporting ribs or feet which are frequently provided to elevate the electrodes above the bottom of the battery container. Such supporting structures have heretofore generally been required to provide a space for reception of sloughed active material. We have discovered that the efficiency of the electrolyte is materially impaired by collection of the portion of highest specific gravity in the sediment-receiving spaces. The present invention provides for a constant gravity circulation of all the electrolyte in operative relation to the electrodes and for other advantages, as will appear from the succeeding description, in connection with the accompanying drawing, in which:

Fig. 1 is a vertical section through a storage battery embodying this invention;

Fig. 2 is a view similar to Fig. 1, showing a modification; and

Figs. 3 and 4 are transverse sections on lines III—III and IV—IV of Figs. 1 and 2, respectively.

In the drawing, J designates a battery casing or jar of any suitable type. Electrodes P and N of positive and negative polarity, respectively, desirably of the plate type, and separators S, desirably in sheet form, are assembled with their plane surfaces in opposition, in the usual manner. The separators are united to and slightly spaced from the electrodes by a marginal coating C of a thermoplastic insulating compound resistant to acid, or by equivalent means adhering or secured to the separators and electrodes. The top margin of the separators need not be coated. The electrodes and separators are set in a layer B of insulating, acid-resistant material which covers the bottom of the casing J. Dislodged active material can not short-circuit adjacent electrodes, as it is prevented by the insulating layer from passing beneath the electrodes and separators.

The battery described may be conveniently assembled in the following manner: The separators are coated marginally by dipping their edge portions in a suitable plastic, such as an acid-resistant pitch. They are then inserted in the electrode assembly, which may comprise a plurality of plates burned or otherwise connected to a bus-bar, as illustrated. The edges of the assembly are warmed to soften the plastic on the separators and cause it to adhere to the electrodes. The same result might be obtained by applying the plastic to the margins of the electrodes and placing the separators against them. A layer of plastic is next flowed on the plane bottom of the jar or enclosing casing, and the electrode-separator assembly is embedded marginally in the layer. Electrolyte E may then be added and the battery is ready for service after charge, or without charge if "preformed" electrodes have been used.

To guard against the possibility of particles of active material passing through the lower portions of the separators, the bottom marginal coating may be extended upwardly, as indicated at 7, to form the impervious pockets 8 to receive dislodged active material. The coating may adhere at the bottom to the electrodes. However, equally good results may be obtained when the separators and electrodes are joined only at the sides and without embedding the lower ends of the electrodes in the layer of plastic on the bottom of the jar. The embedding of the bottom portions in the bed B serves the purpose of the adhering coating at that part. The lower marginal portions or ends of the separators may be impregnated first with a relatively fluid material, such as pitch or paraffin of high melting point, to form an impervious portion 7 extending upwardly a sufficient distance, and then an assembling plastic, for example pitch, may be applied to the lateral margins at opposite sides thereof.

Various other methods may be used in making the receptacles for the electrodes or active material. Fig. 2 for example, illustrates an envelope-type separator S', substantially U-shape in cross-section, having its limbs marginally united to the opposite faces of alternate electrodes, at their lateral marginal edges, as to the positive electrodes P' which usually shed more than the negative electrodes. The bottom ends or bends of such separators may then be set directly on the bottom of the jar but are desirably set in the bed of plastic insulating material B' on the bottom of the jar in order to more securely hold the assembly in place and seal the joints at the bottom corners of the separator and electrode.

We prefer to use separators of the type described in applications filed by R. C. Benner, including Serial No. 530,943, filed January 21, 1922, now Patent No. 1,573,369, granted Feb. 16, 1926, Serial No. 601,411, filed November 16, 1922, and Serial No. 628,843, filed March 20, 1923, now Patent No. 1,677,512, granted July 17, 1928. These separators are formed of silicated cellulosic fibers or plastic-bonded fibers, with or without a deposit of silica gel, and are ordinarily sufficiently impermeable by solids to be used without special marginal impregnation.

Any suitable acid-resistant, insulating plastic which is not brittle at ordinary atmospheric temperatures may be used in preparing the battery. Good results may be obtained with the plastic known in the trade as Sarco pitch, which has a melting point of about 150° C.

In the construction described, all of the sulfuric acid electrolyte is in contact with the electrodes or lies above them. Hence, as the lower part of the acid becomes depleted by formation of lead sulfate in the operation of the battery, the unchanged upper part of the acid of relatively higher specific gravity circulates downwardly into operative contact with the electrodes. There is no body of high gravity acid in the bottom of the cell, below and out of contact with the active material of the electrodes, as in storage cells having jars provided with supporting ribs or electrodes provided with feet. Such heavier acid can become effective only by the relatively slow process of upward diffusion into the lighter acid above. In the present invention, on the contrary, a continuous positive gravity circulation of much higher rate is established, because the heavier unexhausted electrolyte near the top and above the electrodes flows downwardly while the lighter exhausted electrolyte rises to the top.

The chief function of the plate-supporting ribs, i. e., the provision of space for harmless collection of displaced active material, is accomplished, according to the present invention, by the provision of the pockets or spaces between the electrodes and the separators. No detriment is possible by omitting the supporting ribs, inasmuch as internal short circuits by sediment and dislodged active material are prevented by the pitch bed in the bottom of the jar. On the other hand, greater efficiency is afforded by the economy of space thus attained.

Among the further advantages of the present construction is the effect of the reenforcement of the separators by the marginal plastic coating. This makes them much more resistant to injury by buckling or warping of the electrodes. Vibration of the electrodes also is diminished by the embedding of their margins, and abrasion of the separators and loosening of active material are correspondingly lessened.

The construction described is particularly advantageous in batteries comprising thin electrode plates, but it is not limited to any particular electrode, separator, or type of assembly. When separators of the kind referred to herein are used, they may be placed directly against the positive electrode, forming an armor for the active material thereon.

We claim:

1. A storage cell assembly comprising electrodes, and a separator spaced therefrom and having its lateral margins coated with a thermosplastic material, said coating connecting said marginal portions with the lateral marginal portions of the adjacent electrodes.

2. A storage cell assembly comprising electrodes, and a separator having its lateral margins coated with a thermoplastic material and connected to the opposing faces of the adjacent electrodes by said material, said separator also having a bottom portion impervious to solid particles and out of contact with the electrodes.

3. In a storage cell, an electrode, and separators on opposite sides of said electrode having lateral margins coated with an insulating material, said coating connecting said separators to the electrodes at the lateral margins thereof and defining spaces between the body of said electrode and the separators.

4. A storage cell assembly comprising electrodes, and separators having lateral and bottom margins coated with an insulating material, said coating connecting said separators to certain of the electrodes at the lateral and bottom margins thereof and spacing the uncoated portions of said separators from said electrodes.

5. A storage battery comprising a casing, a layer of an insulating, acid-resistant substance on the bottom of the casing, electrodes carrying active material, and separators marginally coated with a plastic uniting them to the opposite faces of such electrodes at the lateral margins of such faces, the electrodes and separators having their lower margins set in the said layer.

6. A storage battery comprising a casing, a layer of an insulating, acid-resistant substance on the bottom of the casing, electrodes carrying active material, and separators marginally coated with a plastic uniting them to the opposite faces of such electrodes at the lateral margins of such faces, the electrodes and separators having their lower margins set in the said layer, and the separators also having a bottom marginal coating extending above the insulating layer, whereby active material collecting on the layer is prevented from passing through the separators.

7. A storage battery element comprising a plurality of positive plates, a plurality of negative plates in alternate relationship with said positive plates, a separator interposed between the adjacent surfaces of each pair of plates, and a coating of thermoplastic material connecting the marginal portions of said separators to the marginal portions of the adjacent plate surfaces and spacing said separator therefrom to form isolated sediment-receiving chambers between each separator and the adjacent plate surfaces.

In testimony whereof, we affix our signatures.

RAYMOND C. BENNER.
LEROY C. WERKING.